United States Patent

Andou et al.

[11] Patent Number: 5,884,477
[45] Date of Patent: Mar. 23, 1999

[54] FUEL SUPPLY CONTROL SYSTEM FOR INTERNAL COMBUSTION ENGINES

[75] Inventors: Hiroyuki Andou; Kotaro Miyashita; Hiroshi Yatani; Takashi Iwamoto, all of Wako, Japan

[73] Assignee: Honda Giken Kogyo Kabushiki Kaisha, Tokyo, Japan

[21] Appl. No.: 12,186

[22] Filed: Jan. 23, 1998

[30] Foreign Application Priority Data

Jan. 24, 1997 [JP] Japan ................................ 9-024530

[51] Int. Cl.⁶ ........................................... F01N 3/00
[52] U.S. Cl. ............................................. 60/285; 123/486
[58] Field of Search ............................. 60/285; 123/478, 123/480, 486, 325, 406.47

[56] References Cited

U.S. PATENT DOCUMENTS 5,570,575  11/1996  Sato et al. .................................. 60/277
5,661,972   9/1997  Katoh et al. ............................... 60/276
5,802,843   9/1998  Kurihara et al. ........................... 60/274

FOREIGN PATENT DOCUMENTS 53-8427  1/1978  Japan .

*Primary Examiner*—Thomas E. Denion
*Assistant Examiner*—Binh Tran
*Attorney, Agent, or Firm*—Nikaido, Marmelstein, Murray & Oram LLP

[57] ABSTRACT

A fuel supply control system for an internal combustion engine has an exhaust gas-purifying device arranged in the exhaust system of the engine. When a predetermined high load condition of the engine is detected, an amount of fuel supplied to the engine is increased. Temperature values indicative of the temperature of the exhaust gas-purifying device are stored and a stored temperature value is read out according to operating conditions of the engine. A correction coefficient for correcting the read-out temperature value is determined, and the temperature of the exhaust gas-purifying device is estimated based on the read-out temperature value and the determined correction coefficient. When the predetermined high load condition is detected and at the same time the estimated temperature is higher than a predetermined temperature value, the amount of fuel supplied to the engine is actually increased.

9 Claims, 13 Drawing Sheets

FUEL SUPPLY CONTROL SYSTEM FOR INTERNAL COMBUSTION ENGINES

BACKGROUND OF THE INVENTION

1. Field of the Invention

This invention relates to a fuel supply control system for internal combustion engines, which operates to increase the amount of fuel to be supplied to the engine when a high load condition of the engine is detected.

2. Prior Art

A conventional fuel supply control system for internal combustion engines is generally adapted to increase an amount of fuel supplied to the engine when the engine enters a predetermined high load condition, by multiplying a basic fuel amount by a predetermined coefficient, to thereby enrich the air-fuel ratio of a mixture supplied to the engine, immediately after the opening of a throttle valve of the engine exceeds a predetermined value corresponding to the predetermined high load condition, or upon the lapse of a predetermined time period (e.g. approximately 1 second) after the absolute value of pressure within the intake pipe of the engine exceeds a predetermined value corresponding to the predetermined high load condition. By virtue of this increase of the fuel supply amount, not only the engine output can be increased in the high load condition, but also the combustion temperature of the engine can be lowered to prevent a rise in the temperature of an exhaust gas-purifying device (catalyst) arranged in the exhaust system of the engine, to thereby prevent the catalyst from being deteriorated or damaged by heat.

Further, a fuel supply control system of this kind is known, e.g. from Japanese Laid-Open Patent Publication (Kokai) No. 53-8427, which increases the fuel supply amount by terminating air-fuel ratio feedback control when the pressure of intake air supplied to the engine continuously exceeds a predetermined value over a predetermined time period, to thereby obtain a high engine output and maintain good performance of the catalyst when the engine is in a high rotational speed and high load condition in which an increased intake air amount is supplied to the engine.

According to the conventional fuel supply control systems, however, when it is determined that the engine is in a high load condition, the increase of the fuel supply amount is carried out even if the catalyst temperature is low and does not reach a value at or above which the catalyst can be deteriorated or damaged by heat. This is disadvantageous in respect of exhaust emission characteristics and fuel economy.

SUMMARY OF THE INVENTION

It is the object of the invention to provide a fuel supply control system for internal combustion engines, which is capable of carrying out increase of the fuel supply amount at timing suitable for the temperature of the catalyst, thereby improving the exhaust emission characteristics and fuel economy as well as preventing the catalyst from being deteriorated or damaged by heat.

To attain the above object, the present invention provides a fuel supply control system for an internal combustion engine having an exhaust system, and an exhaust gas-purifying device arranged in the exhaust system, comprising:

high load condition-detecting means for detecting a predetermined high load condition of the engine;

fuel-increasing means for increasing an amount of fuel supplied to the engine when the engine is in the predetermined high load condition;

temperature value memory means that stores temperature values indicative of temperature of the exhaust gas-purifying device according to operating conditions of the engine;

readout means for reading out a temperature value from the temperature value memory means according to operating conditions of the engine;

correction coefficient-determining means for determining a correction coefficient for correcting the temperature value read out from the temperature value memory means;

temperature-estimating means for estimating temperature of the exhaust gas-purifying device, based on the read-out temperature value and the correction coefficient; and control means for enabling the fuel-increasing means to increase the amount of fuel when the predetermined high load condition is detected and at the same time the estimated temperature is higher than a predetermined temperature value.

Preferably, the correction coefficient-determining means determines the correction coefficient according to operating conditions of the engine.

Preferably, the correction coefficient-determining means sets the correction coefficient to different values between when the engine is under fuel cut and when the engine is in the predetermined high load condition.

More preferably, the correction coefficient-determining means determines correction coefficient according to rotational speed of the engine and load on the engine.

Further preferably, the correction coefficient-determining means sets the correction coefficient to a larger value as the rotational speed of the engine is larger and the load on the engine is higher.

Advantageously, the fuel supply control system further includes correction means for correcting the read-out value of temperature according to at least one parameter of engine coolant temperature, intake air temperature of the engine, atmospheric pressure, and ignition timing of the engine.

Preferably, each of the temperature values stored in the temperature value memory means is set to a higher value by a predetermined amount than an actual value of temperature of the exhaust gas-purifying device to be assumed in the same operating condition of the engine as an operating condition of the engine to which the each of the temperature values corresponds.

Alternatively, the predetermined temperature value is set to a lower value by a predetermined amount than a temperature value corresponding to a predetermined high-temperature state of the exhaust gas-purifying device.

Specifically, the predetermined amount is set to such a value that while the exhaust gas-purifying device was not determined to be in the predetermined high-temperature state in a last loop of execution of fuel supply control, temperature of the exhaust gas-purifying device does not suddenly exceed a value corresponding to the high-temperature state in a present loop of execution of the fuel supply control.

The above and other objects, features and advantages of the invention will become more apparent from the following detailed description taken in conjunction with the accompanying drawings.

BRIEF DESCRIPTION OF THE DRAWINGS

FIGS. 18A to 18D collectively form a timing chart showing the timing relationship between an estimated catalyst temperature TCT, and values of a catalyst temperature determination flag FCATWOT, an intake pressure determination flag FPBWOT, and a high load determination flag FWOT, in which:

FIG. 18A shows changes in the TCT value;

FIG. 18B shows changes in the value of the flag FCATWOT;

FIG. 18C shows changes in the value of the flag FPBWOT; and

FIG. 18D shows changes in the value of the flag FWOT; and

DETAILED DESCRIPTION

The invention will now be described in detail with reference to the drawings showing an embodiment thereof.

Figure 1:
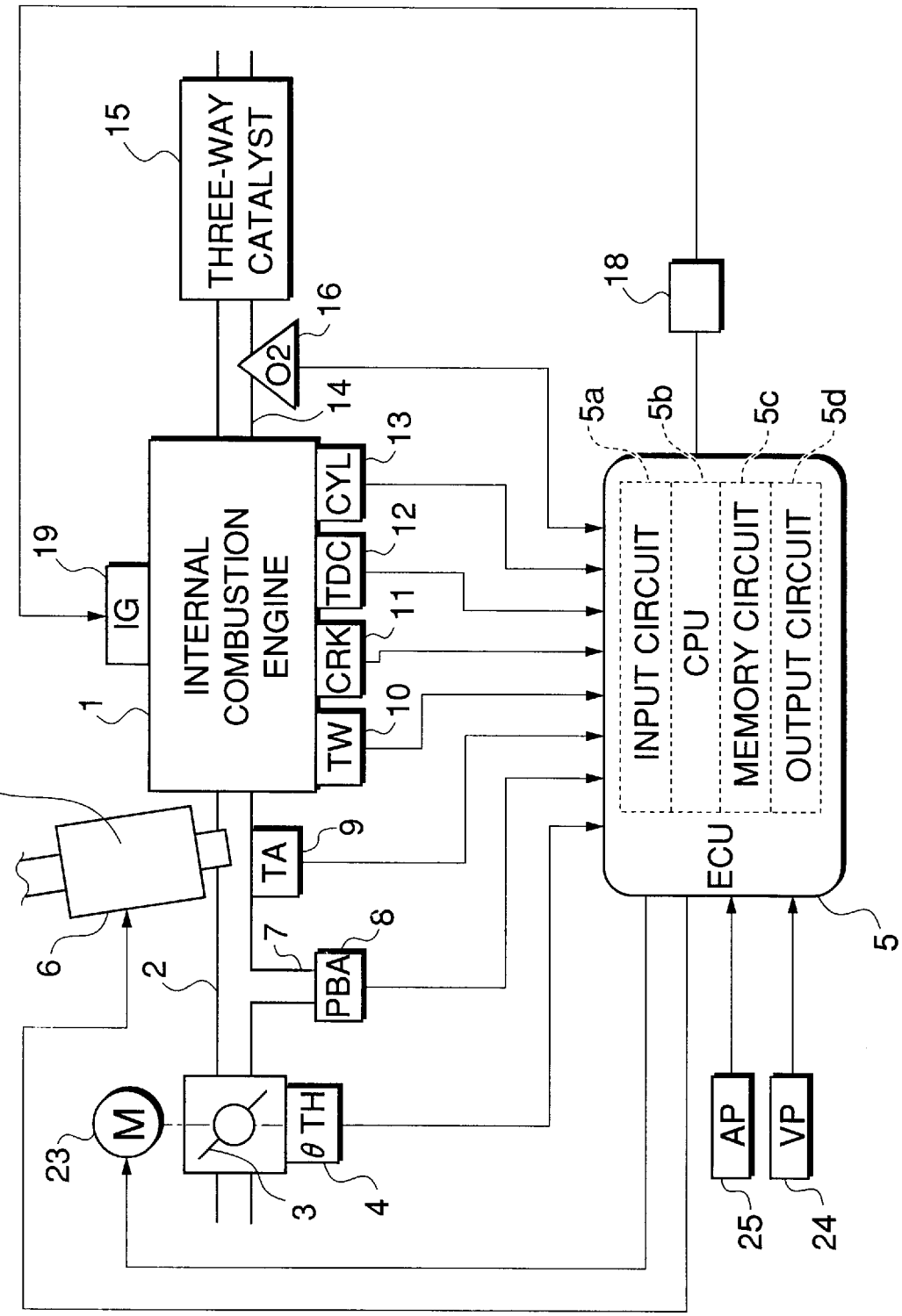
FIG. 1 is a block diagram schematically showing the whole arrangement of an internal combustion engine and a fuel supply control system therefor, according to an embodiment of the invention.

Referring first to FIG. 1, there is illustrated the whole arrangement of an internal combustion engine (hereinafter simply referred to as "the engine") and a fuel supply control system therefor, according to an embodiment of the invention.

In the figure, reference numeral 1 designates an internal combustion engine, which has a cylinder block to which is connected an intake pipe 2. A throttle valve 3 is arranged in the intake pipe 2. A throttle valve opening (TH) sensor 4 is connected to the throttle valve 3 and electrically connected to an electronic control unit (hereinafter referred to as "the ECU") 5, for supplying an electric signal indicative of the sensed throttle valve opening TH to the ECU 5.

Further electrically connected to the ECU 5 are a throttle actuator 23 for driving the throttle valve 3 and an accelerator pedal position (AP) sensor 25 for detecting the position AP of an accelerator pedal, not shown, of a vehicle in which the engine is installed. The ECU 5 controls the operation of the throttle actuator 23 in response to the accelerator pedal position AP detected by the accelerator pedal position sensor 25.

Fuel injection valves 6, only one of which is shown, are inserted into the intake pipe 2 at locations intermediate between the cylinder block of the engine 1 and the throttle valve 3 and slightly upstream of respective intake valves, not shown. The fuel injection valves 6 are connected to a fuel pump, not shown, and electrically connected to the ECU 5 to have their valve opening periods controlled by signals therefrom.

On the other hand, an intake pipe absolute pressure (PBA) sensor 8 is communicated with the interior of the intake pipe 2 via a conduit 7 at a location immediately downstream of the throttle valve 3, for sensing absolute pressure or intake pressure (PBA) within the intake pipe 2, and is electrically connected to the ECU 5, for supplying an electric signal indicative of the sensed absolute pressure PBA to the ECU 5. Further, an intake air temperature (TA) sensor 9 is inserted into the intake pipe 2 at a location downstream of the PBA sensor 8, for supplying an electric signal indicative of the sensed intake air temperature TA to the ECU 5.

An engine coolant temperature (TW) sensor 10, which may be formed of a thermistor or the like, is mounted in the cylinder block of the engine 1 which is filled with engine coolant, for supplying an electric signal indicative of the sensed engine coolant temperature TW to the ECU 5.

A cylinder-discriminating sensor (hereinafter referred to as "the CYL sensor") 13, a TDC sensor 12, and a crank angle (CRK) sensor 11 are arranged in facing relation to a camshaft or a crankshaft of the engine 1, neither of which is shown. The CYL sensor 13 generates a signal pulse (hereinafter referred to as "a CYL signal pulse") at a predetermined crank angle of a particular cylinder of the engine 1. The TDC sensor 12 generates a signal pulse (hereinafter referred to as "a TDC signal pulse") at each of predetermined crank angles (e.g. whenever the crankshaft rotates through 180 degrees when the engine is of the 4-cylinder type) which each correspond to a predetermined crank angle before a top dead point (TDC) of each cylinder corresponding to the start of the intake stroke of the cylinder. The CRK sensor 11 generates a signal pulse (hereinafter referred to as "a CRK signal pulse") at one of predetermined crank angles (e.g. whenever the crankshaft rotates through 30 degrees) with a predetermined repetition period shorter than the repetition period of TDC signal pulses. The CYL signal pulse, TDC signal pulse, and CRK signal pulse are supplied to the ECU 5.

A spark plug 19 is arranged in each cylinder of the engine 1 and electrically connected to the ECU 5 through a distributor 18.

Further electrically connected to the ECU 5 are a vehicle speed sensor 24 for detecting the traveling speed (vehicle speed) VP of the vehicle and an atmospheric pressure sensor for detecting atmospheric pressure (PA). Signals indicative of the sensed vehicle speed VP and atmospheric pressure PA are supplied to the ECU 5.

A three-way catalyst (catalytic converter) 15 is arranged in an exhaust pipe 14 of the engine 1, for purifying noxious components of exhaust gases emitted from the engine 1, such as HC, CO, and NOx. An oxygen concentration sensor (hereinafter referred to as "the O2 sensor") 16 as an air-fuel ratio sensor is arranged in the exhaust pipe 14 at a location upstream of the catalyst 15, which detects the concentration of oxygen present in exhaust gases and supplies an electric signal indicative of the sensed oxygen concentration to the ECU 5.

The ECU 5 is comprised of an input circuit 5a having the functions of shaping the waveforms of input signals from various sensors, shifting the voltage levels of sensor output signals to a predetermined level, converting analog signals from analog-output sensors to digital signals, and so forth, a central processing unit (hereinafter referred to as the "the CPU") 5b, a memory circuit 5c storing various operational programs which are executed by the CPU 5b, and for storing results of calculations therefrom, etc., and an output circuit 5d which supplies driving signals to the fuel injection valves 6, the distributor 18, etc.

The CPU 5b operates in response to signals from various engine operating parameter sensors including those mentioned above to determine operating conditions in which the engine 1 is operating, such as an air-fuel ratio feedback control region in which air-fuel ratio control is carried out in response to the oxygen concentration of exhaust gases detected by the O2 sensor 16, and air-fuel ratio open-loop control regions, and calculates, based upon the determined engine operating conditions, a fuel injection period Tout for each of the fuel injection valves 6, in synchronism with generation of TDC signal pulses, by the use of the following equation (1):

$$Tout = Ti \times KO2 \times K1 + K2 \qquad (1)$$

where Ti represents a basic value of the fuel injection period Tout, which is determined according to the engine rotational speed NE and the intake pipe absolute pressure PBA, by the use of a Ti map, not shown, which is stored in the memory circuit 5c.

KO2 represents an air-fuel ratio correction coefficient calculated based on the output signal from the O2 sensor 16, which is calculated to such a value that the air-fuel ratio of an air-fuel mixture supplied to the engine 1 becomes equal to a desired air-fuel ratio when the engine 1 is operating in the air-fuel ratio feedback control region, while it is set to predetermined values corresponding to the respective air-fuel ratio open-loop control regions of the engine 1 when the engine 1 is in these open-loop control regions.

K1 and K2 represent other correction coefficients and correction variables, respectively, which are set according to engine operating parameters to such values as optimize engine operating characteristics, such as fuel consumption and engine accelerability. For example, the correction coefficient K1 represents a high load-dependent fuel increasing coefficient KWOT, a coolant temperature-dependent fuel increasing coefficient KTW, etc.

Further, the CPU 5b calculates the ignition timing θ IG of the engine, based on the determined engine operating conditions. Driving signals corresponding to the Tout and θ IG values calculated as above are delivered via the output circuit 5d to the fuel injection valves 6 and the spark plugs 19, respectively, to drive them.

Next, description will be made of the operation of the fuel supply control system having the above described construction. First, under a high load condition (WOT condition) of the engine 1, in which the intake pipe absolute pressure PBA or the throttle valve opening TH exceeds a predetermined value, it is determined whether or not the air-fuel ratio feedback control responsive to the output from the O2 sensor 16 is to be terminated and fuel supply increase control based on the engine rotational speed NE and the intake pipe absolute pressure PBA is to be started, depending on an estimated catalyst temperature TCT.

Figure 2:
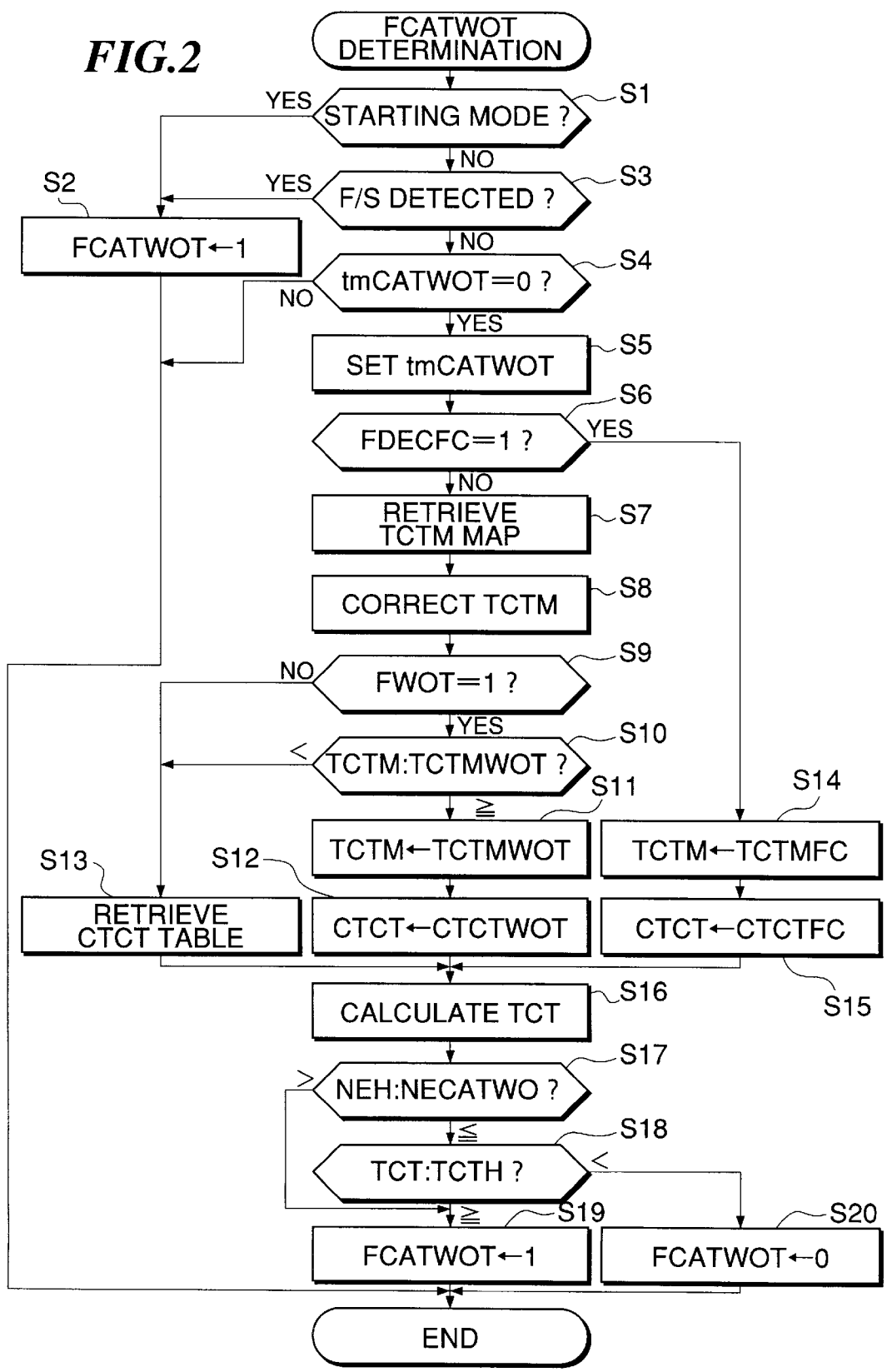
FIG. 2 is a flowchart showing a routine for determining the value of a catalyst temperature determination flag FCAT-WOT.

FIG. 2 shows a program for determining a value of a catalyst temperature determination flag FCATWOT, which is executed by the ECU 5 as a background process. First, it is determined at a step S1 whether or not the engine 1 is in starting mode. If the engine is in the starting mode, the catalyst temperature determination flag FCATWOT is set to 1 at a step S2, followed by terminating the present routine.

On the other hand, if the engine 1 is not in the starting mode, it is determined at a step S3 whether or not a fail-safe action for a sensor (e.g. for abnormality of the PBA sensor 8 and/or the CRK sensor 11) has been detected. If any fail-safe action has been detected, estimation of the catalyst temperature is difficult to carry out, and therefore the program proceeds to the step S2, wherein the catalyst temperature determination flag FCATWOT is set to 1, followed by terminating the present routine.

The present process of FIG. 2 is executed at predetermined time intervals (e.g. 0.5 sec), and therefore it is determined at a step S4 whether or not the count value of a down-counting timer tmCATWOT is equal to 0. The timer tmCATWOT is set to 0.5 sec as an initial value, and the count value of the timer tmCATWOT is subtracted from the initial value with the lapse of time. If the count value of the timer tmCATWOT is not equal to 0, the program is immediately terminated, whereas if the count value is equal to 0, the timer tmCATWOT is reset to the initial value (0.5 sec) at a step S5.

Then, it is determined at a step S6 whether or not a fuel cut flag FDECFC which, when set to 1, indicates that fuel cut is being carried out during deceleration of the engine 1, assumes 1. If the fuel cut flag FDECFC is equal to 0, a TCTM map, shown in FIG. 3, is retrieved to determine a catalyst temperature map value TCTM according to the engine rotational speed NE and the intake pipe absolute pressure PBA at a step S7.

Figure 3:
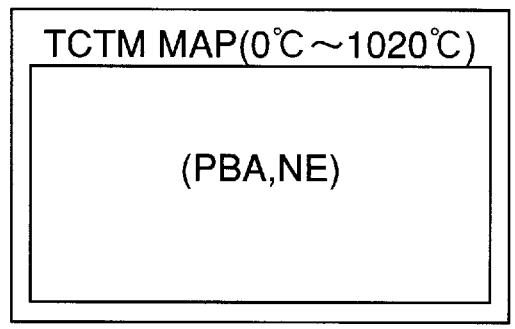
FIG. 3 shows a TCTM map for determining a catalyst temperature map value TCTM.

FIG. 3 shows the TCTM map as temperature value memory means in which values of the catalyst temperature map value TCTM are set. The TCTM map is prepared by actually measuring the catalyst temperature ranging from 0° C. to 1020° C. assumed when the engine is actually operated with the engine rotational speed NE and the intake pipe absolute pressure PBA set to different values, to thereby set the measured values as the map values TCTM. In the present embodiment, the map values TCTM are each set to a value higher by a predetermined amount (e.g. 50° C.) than an actually measured value of the catalyst temperature at the same NE and PBA values.

Further, the catalyst temperature map value TCTM determined at the step S7 may be corrected according to the atmospheric pressure PA, the intake air temperature TA, the engine coolant temperature TW, and an ignition timing correction amount IGC at a step S8, by the use of the following equation (2):

$$TCTM = TCTM \times KTCTPA + DTCTTA + DTCTIG + DTCTTW \quad (2)$$

where KTCTPA represents an atmospheric pressure-dependent correction coefficient, DTCTTA an intake air temperature-dependent correction variable, DTCTIG an ignition timing-dependent correction variable, and DTCTTW an engine coolant temperature-dependent correction variable, respectively.

Figure 4:
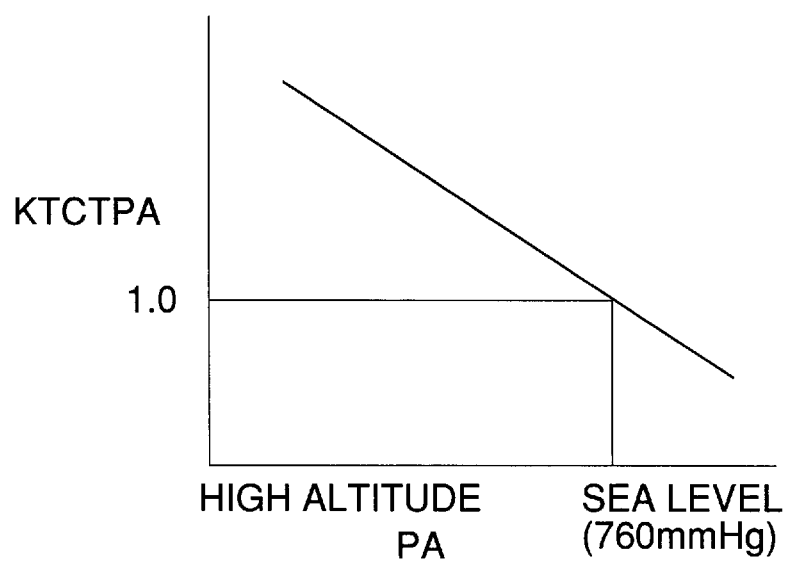
FIG. 4 shows a table for determining an atmospheric pressure-dependent correction coefficient KTCTPA.

FIG. 4 shows a table for determining the atmospheric pressure-dependent correction coefficient KTCTPA. As shown in FIG. 4, the correction coefficient KTCTPA is set to a smaller value as the atmospheric pressure PA is higher. For example, when the engine is operating at 0 m above the sea level, i.e. when the PA value assumes 760 mmHg, the KTCTPA value is set to 1.0.

Figure 5:
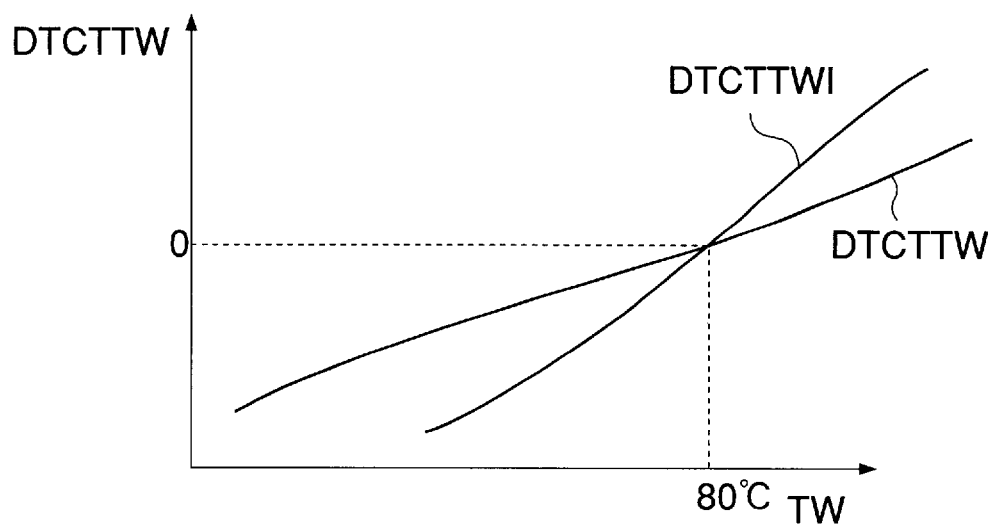
FIG. 5 shows a table for determining an engine coolant temperature-dependent correction variable DTCTTW.

FIG. 5 shows a table for determining the coolant temperature-dependent correction variable DTCTTW. As shown in FIG. 5, the correction variable DTCTTW is set to a larger value as the engine coolant temperature TW is higher. For example, when the TW value assumes 80° C., the DTCTTW value is set to 0.

Figure 6:
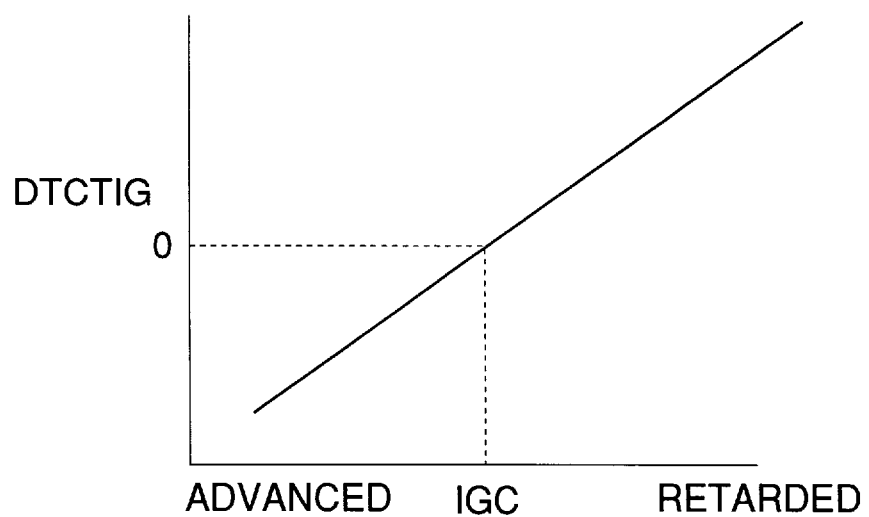
FIG. 6 shows a table for determining an ignition timing-dependent correction variable DTCTIG.

FIG. 6 shows a table for determining the ignition timing-dependent correction variable DTCTIG. As shown in FIG. 6, the correction variable DTCTIG is set to a larger value as the ignition timing correction amount IGC is set to a more retarding side. For example, when the ignition timing correction amount IGC is 0, the DTCTIG value is set to 0.

Figure 7:
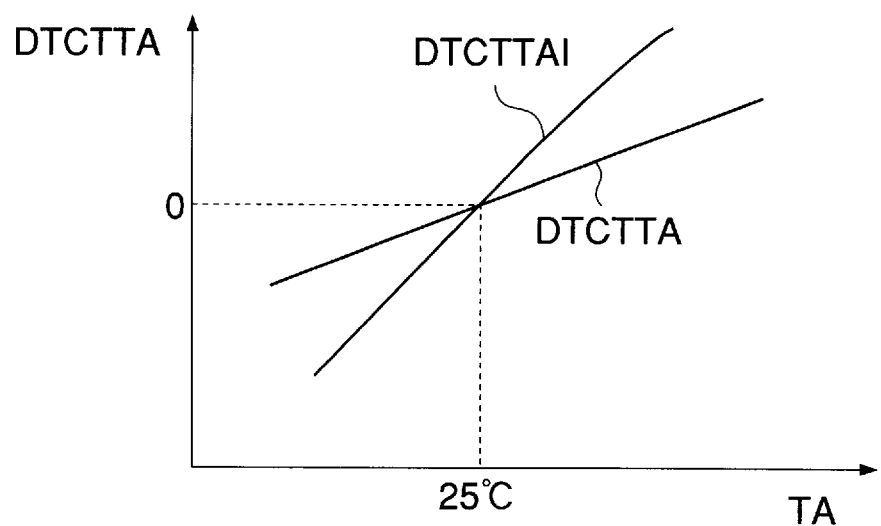
FIG. 7 shows a table for determining an intake air temperature-dependent correction variable DTCTTA.

FIG. 7 shows a table for determining the intake air temperature-dependent correction variable DTCTTA. As shown in FIG. 7, the correction variable DTCTTA is set to a larger value as the intake air temperature is higher. For example, when the TA value assumes 25° C., the DTCTTA value is set to 0.

Then, it is determined at a step S9 whether or not a high load determination flag FWOT which, when set to 1, indicates that the engine is in the high load condition (WOT condition) and hence execution of the fuel supply increase control is permitted, is set to 1. If the high load determination flag FWOT assumes 1, it is determined at a step S10 whether or not the catalyst temperature map value TCTM-WOT is equal to or higher than a predetermined value TCTMWOT (e.g. 900° C.).

If TCTM≧TCTMWOT holds, the catalyst temperature map value TCTM is set to the predetermined value TCTM-WOT at a step S11. Then, a temperature-dependent correction coefficient CTCT is set to a predetermined value CTCT-WOT at a step S12.

Figure 8:
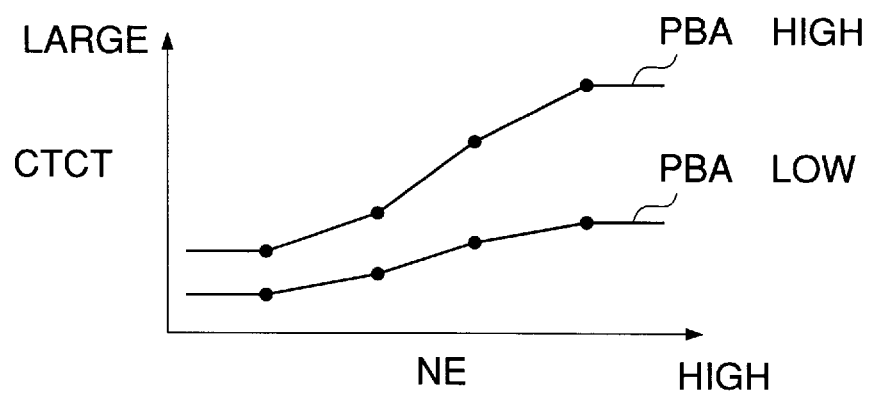
FIG. 8 shows a CTCT table for determining a catalyst temperature-dependent correction coefficient CTCT.

On the other hand, if the high load determination flag FWOT is not equal to 1 at the step S9, or if the catalyst temperature map value TCTM is lower than the predetermined value TCTMWOT, a CTCT table, shown in FIG. 8, is retrieved, to thereby determine the temperature-dependent correction coefficient CTCT according to the engine rotational speed NE and the intake pipe absolute pressure PBA at a step S13.

As shown in FIG. 8, the CTCT table is set such that the temperature-dependent correction coefficient CTCT is set to a larger value as the engine rotational speed NE is higher and/or the intake pipe absolute pressure PBA is higher.

On the other hand, if it is determined at the step S6 that fuel cut is being carried out during deceleration of the engine, the catalyst temperature map value TCTM is set to a predetermined value TCTMFC suitable for fuel cut (e.g. 500° C.) which is lower than the predetermined value TCTMWOT employed during the WOT condition, at a step S14, and the temperature-dependent correction coefficient CTCT is set to a predetermined value CTCTFC suitable for fuel cut which is smaller than the predetermined value CTCTWOT employed during the WOT condition, at a step S15.

Then, at a step S16, the estimated catalyst temperature TCT is calculated based on the catalyst temperature map value TCTM and the temperature-dependent correction coefficient CTCT determined at the steps S11 to S15, by the use of the following equation (3):

$$TCT(n) = TCT(n-1) + (TCTM - TCT(n-1)) \times CTCT \quad (3)$$

where n represents the present value of the estimated catalyst temperature TCT, and n−1 the last value of the TCT value. Further, an initial value TCTI of the TCT value is set to 200° C. when the coolant temperature TW is equal to or lower than 50° C., while it is set to 500° C. when the coolant temperature TW is higher than 50° C. Further, the initial value TCTI is corrected according to a coolant temperature initial value-dependent correction variable DTCTTWI shown in FIG. 5 and an intake air temperature initial value-dependent correction variable DTCTTAI shown in FIG. 7, by the use of the following equation (4):

$$TCTI = TCTI + DTCTTAI + DTCTTWI \quad (4)$$

Then, it is determined at a step S17 whether or not the engine rotational speed NE is equal to or lower than a predetermined value NECATWO. The predetermined value NECATWO has a hysteresis, and in the present embodiment, an upper value of the predetermined value NECATWO is set to 5000 rpm, while a lower value of the same is set to 4800 rpm.

If NE≦NECATWO holds, it is determined at a step S18 whether or not the estimated catalyst temperature TCT is equal to or higher than a predetermined value TCTH, which means that the catalyst 15 is in a high-temperature condition. The predetermined value TCTH is set to a temperature value at or above which the catalyst 15 can be deteriorated or damaged by heat. In the present embodiment, the predetermined value TCTH has a hysteresis, and an upper value of the predetermined value TCTH is set to 900° C., while a lower value of the same is set to 870° C.

If TCT≧TCTH holds, the catalyst temperature determination flag FCATWOT is set to 1 at a step S19, followed by terminating the present routine. On the other hand, if TCT<TCTH holds, the catalyst temperature determination flag FCATWOT is reset to 0 at a step S20, followed by terminating the present routine.

Figure 9:
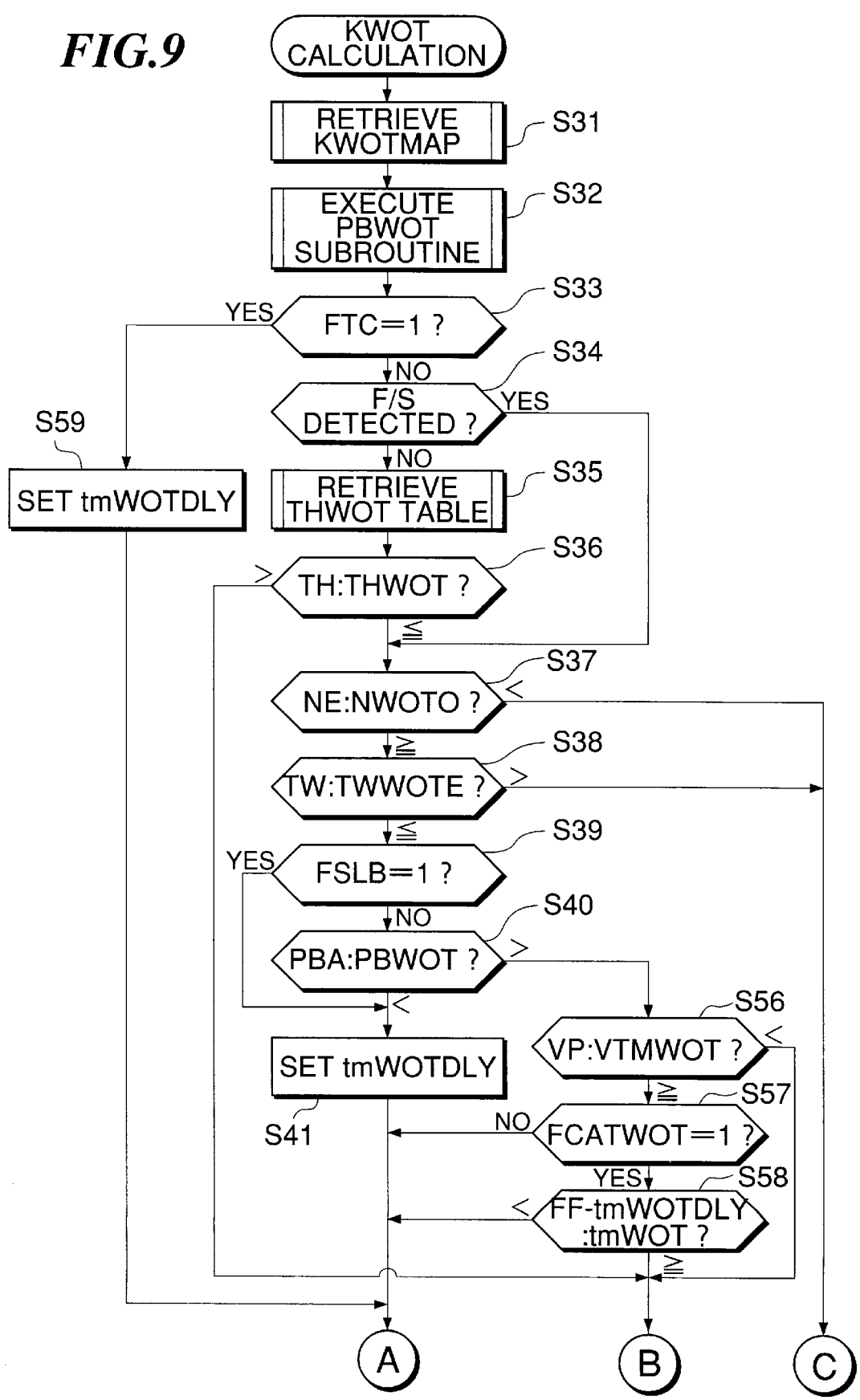
FIG. 9 is a flowchart showing a main routine for calculating a high load-dependent fuel increasing coefficient KWOT.

Next, description will be made of a process for calculating the high load-dependent fuel increasing coefficient KWOT for use in the fuel supply increase control, with reference to FIGS. 9, 10 and 11.

First, at a step S31, a high load-dependent correction coefficient map value KWOTMAP is determined according to the engine rotational speed NE and the intake pipe absolute pressure PBA.

Figure 12:
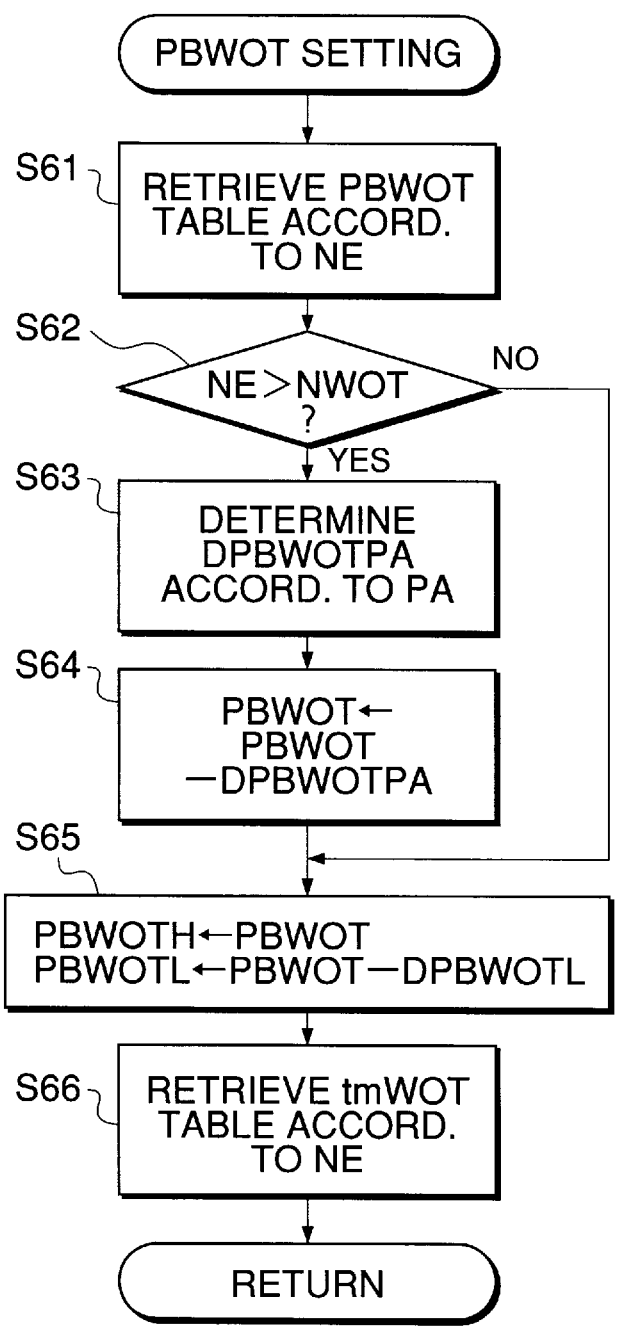
FIG. 12 is a flowchart showing a subroutine for setting a threshold value PBWOT, which is executed at a step S32 in FIG. 9.

Then, at a step S32, a subroutine for setting a threshold value PBWOT for determining the high load condition of the engine 1 is carried out with reference to FIG. 12. This process is executed whenever a TDC signal pulse is generated.

Figure 13:
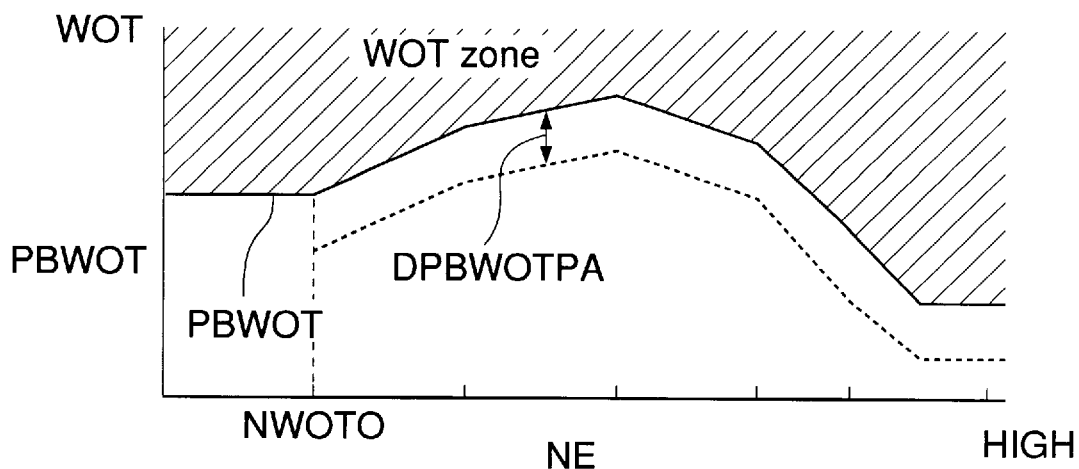
FIG. 13 shows an PBWOT table for determining the threshold value PBWOT, which is used at a step S61 in FIG. 12.

First, at a step S161 in FIG. 12, a PBWOT table, shown in FIG. 13, is retrieved according to the engine rotational speed NE to determine the threshold value PBWOT of the intake pipe absolute pressure PBA. In FIG. 13, a WOT region is indicated by the shaded portion, and when the engine rotational speed NE is in the vicinity of 3000 rpm, the threshold value PBWOT assumes the maximum value.

Then, it is determined at a step S162 whether or not the engine rotational speed NE is higher than a predetermined value NWOT (e.g. 1000 rpm). If NE≦NWOT holds, the program jumps to a step S165, referred to hereinbelow.

Figure 14:
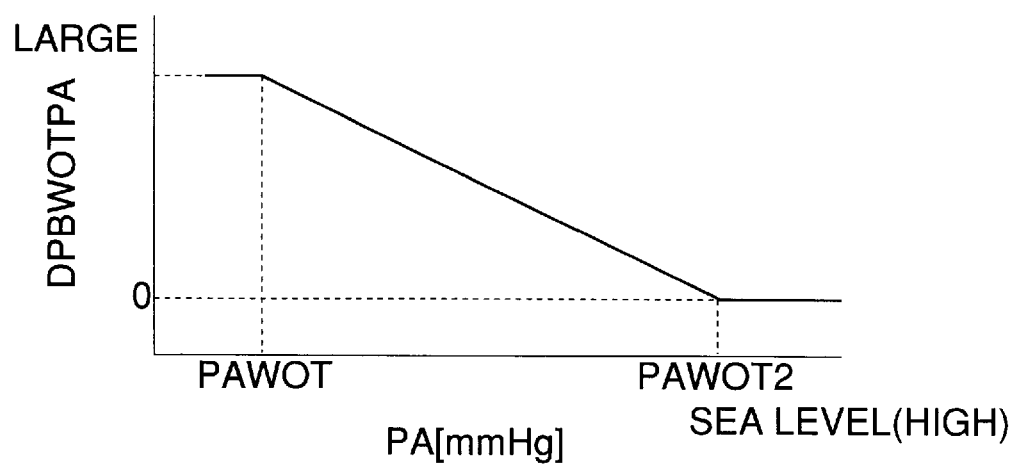
FIG. 14 shows a DPBWOTPA table for determining an atmospheric pressure-dependent correction value DPBWOTPA.

On the other hand, if NE>NWOT holds, an atmospheric pressure-dependent correction value DPBWOTPA is determined from a DPBWOTPA table according to the atmospheric pressure PA at a step S163. Then, at a step S164, the threshold value PBWOT is calculated by subtracting the atmospheric pressure-dependent correction value DPBWOTPA from the threshold value PBWOT retrieved at the step S161. FIG. 14 shows the DPBWOTPA table, which is set such that the atmospheric pressure-dependent correction value DPBWOTPA is set to a smaller value as the atmospheric pressure PA becomes higher.

Then, at a step S165, a hysteresis is added to the threshold value PBWOT calculated at the step S164. More specifically, an upper value of the threshold PBWOT is set to the PBWOT value as it is, whereas a lower value of the same is set to a value obtained by subtracting a correction value DPBWOTL (e.g. 21.48 mmHg) from th threshold value PBWOT.

Figure 15:
FIG. 15 shows a tmWOT table for determining a basic delay time period tmWOT, which is used at a step S66 in FIG. 12.

Then, at a step S166, a tmWOT table, shown in FIG. 15, is retrieved to determine a basic delay time period tmWOT according to the engine rotational speed NE, followed by terminating the present subroutine. The tmWOT table is set such that the basic delay time period tmWOT is shorter as the engine rotational speed NE becomes higher.

Figure 16:
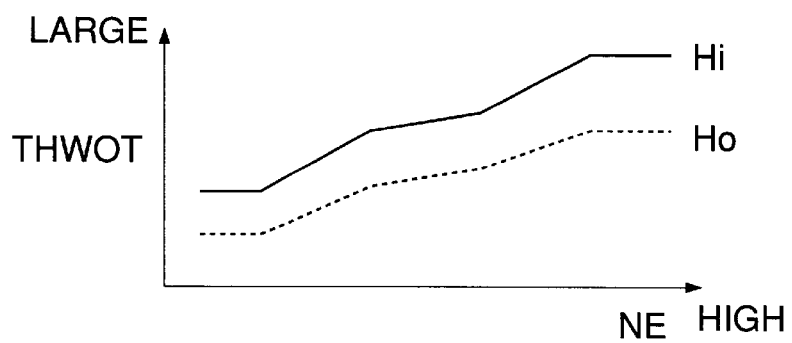
FIG. 16 shows a THWOT table for determining a threshold value THWOT of the throttle valve opening TH, which is used at a step S35 in FIG. 9.

Referring again to FIG. 9, it is determined at a step S33 whether or not a traction control flag FTC which, when set to 1, indicates that traction control is being carried out, assumes 1. If the traction control flag FTC is equal to 0, it is determined at a step S34 whether or not a fail-safe action for a sensor (e.g. for abnormality of the throttle valve opening sensor 4) has been detected. If no fail-safe action is detected, a THWOT table, shown in FIG. 16, is retrieved to determine a threshold value THWOT of the throttle valve opening TH. The THWOT table is set such that the threshold value THWOT is larger as the engine rotational speed NE is higher. In the figure, the solid line Hi indicates an upper value of the threshold value THWOT having a hysteresis, while the broken line Lo indicates a lower value of the same.

Then, it is determined at a step S36 whether or not the throttle valve opening TH is equal to or smaller than the threshold value THWOT. If TH≦THWOT holds, it is determined at a step S37 whether or not the engine rotational speed NE is equal to or higher than a predetermined value NWOTO (e.g. 1000 rpm). If a fail-safe action has been detected at the step S34, the program jumps to the step S37.

If NE≧NWOTO holds, it is determined at a step S38 whether or not the engine coolant temperature TW is equal to or lower than a predetermined value TWWOTE. The predetermined value TWWOTE has a hysteresis such that an upper value thereof is set to 105° C., while a lower value thereof is set to 90° C., in the present embodiment.

If TW≦TWWOTE holds, it is determined at a step S39 whether or not a lean-burn flag FSLB which, when set to 1, indicates that lean burn control is being carried out, assumes 1. If the lean-burn flag FSLB assumes 0, it is determined at a step S40 whether or not the intake pipe absolute pressure PBA is equal to or lower than the threshold value PBWOT calculated at the step S32. If PBA>PBWOT holds, an intake pressure determination flag FPBWOT is set to 1 by executing a background process. On the other hand, if PBA≦PBWOT holds, a delay timer tmWOTDLY is set to a predetermined time period (e.g. 1.0 sec) at a step S41. The delay timer tmWOTDLY is set to the predetermined time period (initial value), and the count value thereof is subtracted from the initial value with the lapse of time.

Figure 11:
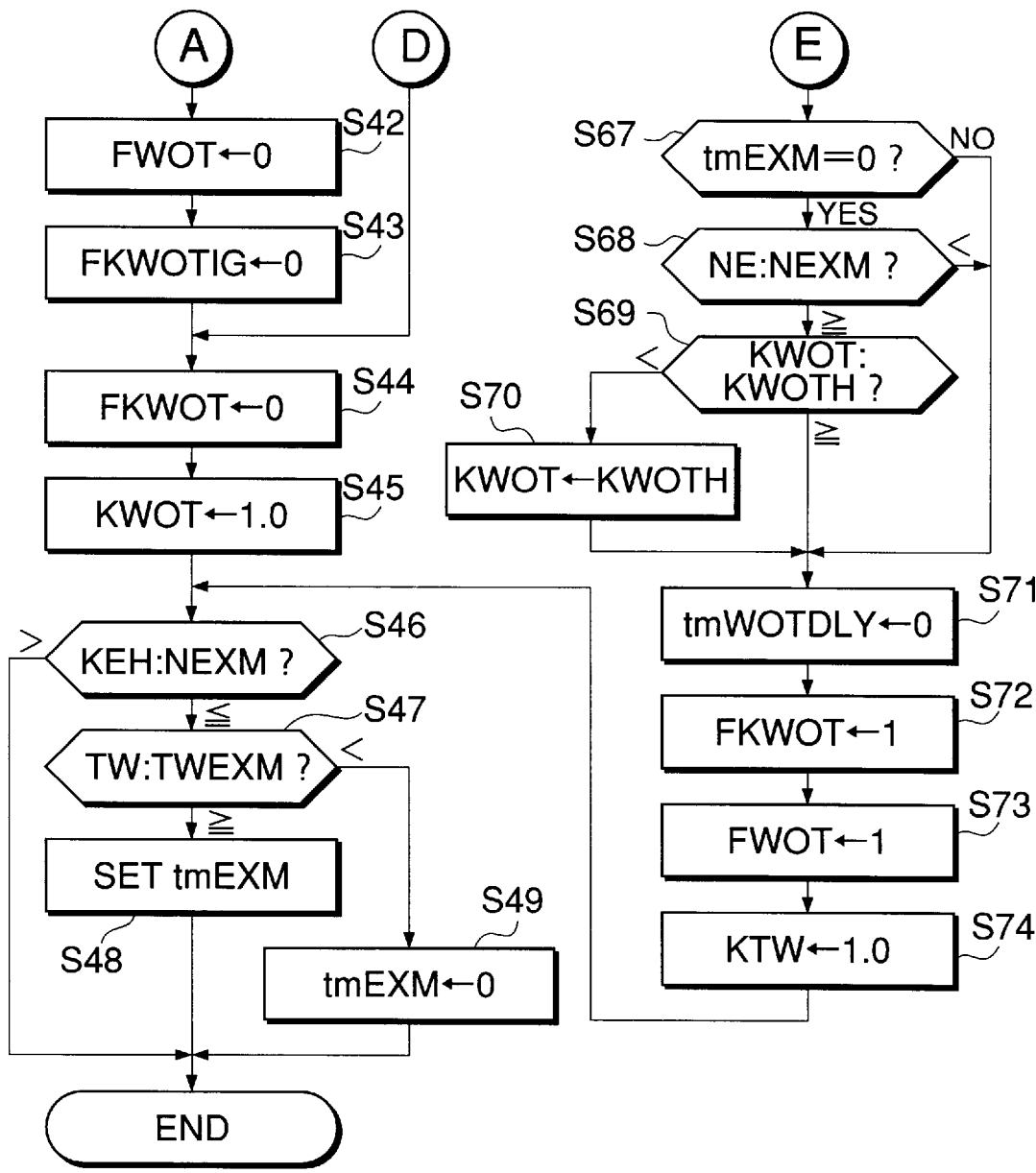
FIG. 11 is a continued part of the flowchart of the FIGS. 9 and 10 routines.

Under the condition where PBA≦PBWOT holds, the fuel supply increase control is not carried out, and therefore the high load determination flag FWOT is set to 0 at a step S42 in FIG. 11. Further, flags FKWOTIG and FKWOT for use in other processes are both set to 0at respective steps S43 and S44, and the high load-dependent fuel increasing coefficient KWOT is set to 1.0 at a step S45.

Then, it is determined at a step S46 whether or not the engine rotational speed NE is equal to or lower than a predetermined value NEXM. The predetermined value NEXM has a hysteresis such that an upper value thereof is set to 4000 rpm while a lower value thereof is set to 3800 rpm, in the present embodiment.

If NE≦NEXM holds, it is determined at a step S47 whether or not the engine coolant temperature TW is equal to or higher than a predetermined value TWEXM (e.g. 70° C.). If TW≧TWEXM holds, a timer tmEXM is set to a predetermined initial value (e.g. 4 min) at a step S48, followed by terminating the present routine. On the other hand, if TW<TWEXM holds, the timer tmEXM is reset to 0 at a step S49, followed by terminating the present routine. Further, if NE>NEXM holds at the step S46, the program is terminated without executing the steps S47 to S49.

Figure 10:
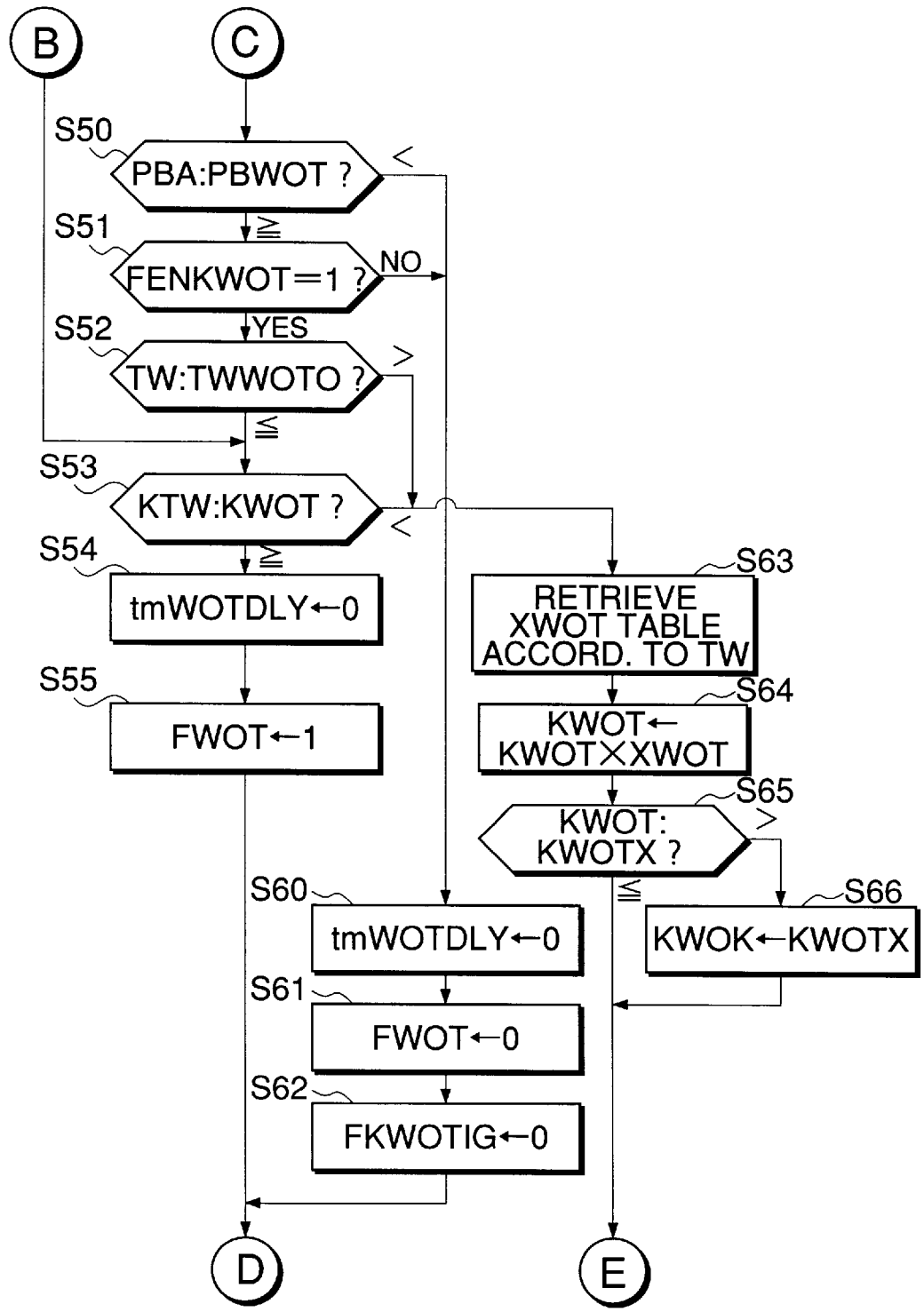
FIG. 10 is a continued part of the flowchart of the FIG. 9 routine.

On the other hand, if NE<NWOTO holds at the step S37, or if TW>TWWOTE holds at the step S38, the program proceeds to a step S50 in FIG. 10, wherein it is determined whether or not the intake pipe absolute pressure PBA is equal to or higher than the threshold value PBWOT determined at the step S32. If PBA≧PBWOT holds, the intake pressure flag FPBWOT is set to 1 by executing a background process.

Further, if PBA≧PBWOT holds, it is determined at a step S51 whether or not a flag FENKWOT is equal to 1. The flag FENKWOT, when set to 1, indicates that the engine enters a low load condition when the engine is restarted after undergoing engine stalling.

If FENKWOT=1 holds, it is determined at a step S52 whether or not the engine coolant temperature TW is equal to or lower than a predetermined value TWWOTO (e.g. 105° C.). If TW≦TWWOTO holds, it is determined at a step S53 whether or not the coolant temperature-dependent fuel increasing coefficient KTW is equal to or higher than the high load-dependent fuel increasing coefficient KWOT.

If KTW≧KWOT holds, the count value of the delay timer tmWOTDLY is set to 0 at a step S54, and the high load determination flag FWOT is set to 1 at a step S55, followed by the program proceeding to the step S44.

On the other hand, if it is determined at the step S40 that the intake pipe absolute pressure PBA is higher than the threshold value PBWOT determined at the step S32, it is determined at a step S56 whether or not the vehicle speed VP is higher than a predetermined value VTMWOT (e.g. 5 km/h). Since PBA>PBWOT holds at the step S40, the intake pressure determination flag FPBWOT is set to 1 by executing the background process. If VP≧FTMWOT holds, it is determined at a step S57 whether or not the catalyst temperature determination flag FCATWOT is set to 1.

If FCATWOT=1 holds, it is determined at a step S58 whether or not a value obtained by subtracting the count value of the delay timer tmWOTDLY from a predetermined time period FF (e.g. 1.0 sec) is equal to or longer than a basic delay time period tmWOT. If (FF−tmWOTDLY)≧tmWOT holds, the program proceeds to the step S53.

On the other hand, if FCATWOT=0 holds at the step S57, or if (FF−tmWOTDLY)<tmWOT holds at the step S58, the program proceeds to the step S42. Further, if VP<VTMWOT holds at the step S56, the program proceeds to the step S53.

On the other hand, if the traction control flag FTC assumes 1 at the step S33, the delay timer tmWOTDLY is set to the initial value (e.g. 1.0 sec) at a step S59, followed by the program jumping to the step S42.

On the other hand, if it is determined at the step S50 that the intake pipe absolute pressure PBA is lower than the threshold value PBWOT determined at the step S32, the delay timer tmWOTDLY is set to 0 at a step S60, and the high load determination flag FWOT is set to 0 at a step S61. Then, the flag FKWOTIG employed in another process is set to 0 at a step S62, followed by the program proceeding to the step S44.

Figure 17:
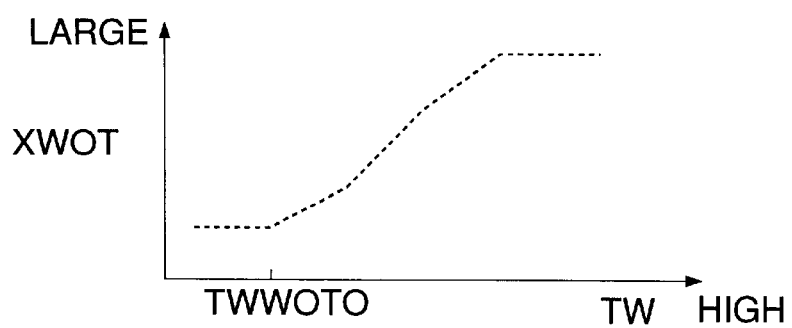
FIG. 17 shows an XWOT table for determining a correction coefficient XWOT, which is used at a step S63 in FIG. 10.
Figure 18:
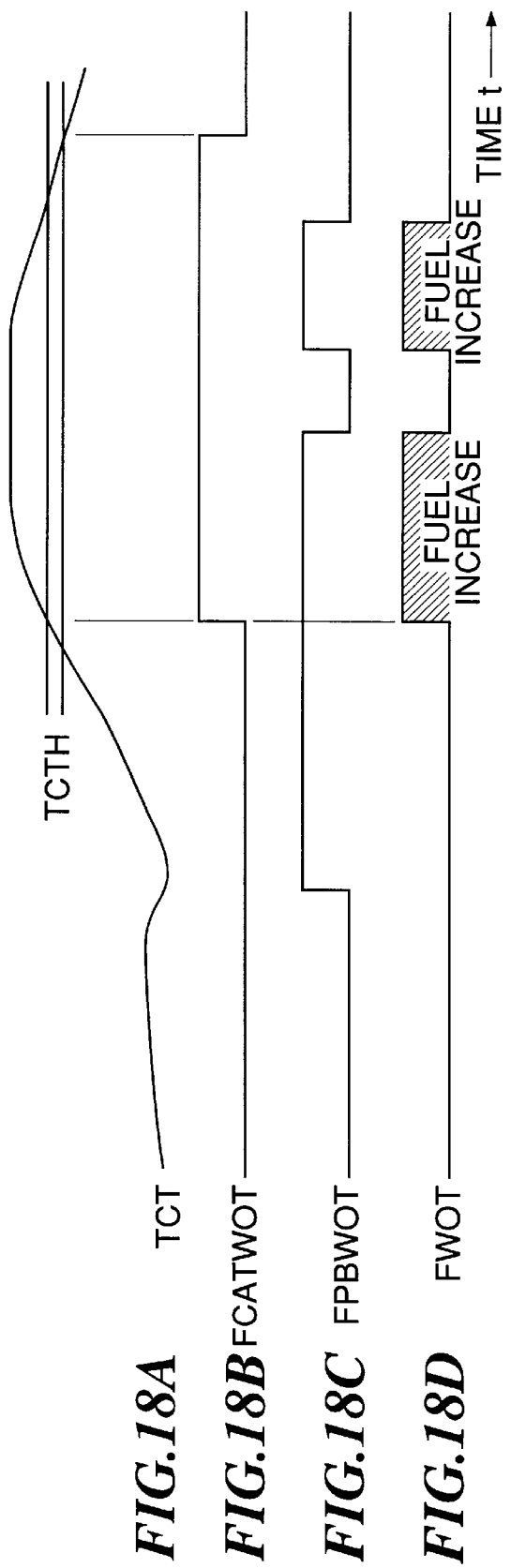

If KTW<KWOT holds at the step S53, an XWOT table, shown in FIG. 17, is retrieved to determine a correction coefficient XWOT according to the engine coolant temperature TW at a step S63. The XWOT table is set such that the correction coefficient XWOT is larger as the engine coolant temperature TW is higher. Then, the high load-dependent fuel increasing coefficient KWOT is multiplied by the thus determined correction coefficient XWOT at a step S64.

Then, it is determined at a step S65 whether or not the high load-dependent fuel increasing coefficient KWOT is equal to or smaller than a predetermined limit value KWOTX. If KWOT>KWOTX holds, the high load-dependent fuel increasing coefficient KWOT is set to the limit value KWOTX at the step S66.

Then, it is determined at a step S67 whether or not the count value of the timer tmEXM set to the initial value (4 min) at the step S48 is equal to 0. If tmEXM=0 holds, it is determined at a step S68 whether or not the engine rotational speed NE is equal to or higher than the predetermined value NEXM. If NE≧NEXM holds, it is determined at a step S69 whether or not the high load-dependent fuel increasing coefficient KWOT is equal to or larger than a predetermined value KWOTH (e.g. 1.3) which is provided for protecting the exhaust pipe 14. If KWOT<KWOTH holds, the high load-dependent fuel increasing coefficient KWOT is set to the predetermined value KWOTH at a step S70.

Then, the delay timer tmWOTDLY is set to 0 at a step S71, and the flag FKWOT employed in another process and the high load determination flag FWOT are set to 1 at steps S72 and S73, respectively. Further, the coolant temperature-dependent fuel increasing coefficient KTW is set to 1 at a step S74, followed by the program proceeding to the step S46. On the other hand, if tmEXM=0 does not hold at the step S67, the program jumps to the step S71.

As described above, according to the present embodiment, even if it is determined at the step S40 that the intake pipe absolute pressure PBA is higher than the threshold value PBWOT and hence the intake pressure determination flag FPBWOT is set to 1, when the estimated catalyst temperature TCT is lower than the predetermined value TCTH, the ECU 5 resets the catalyst temperature determination flag FCATWOT to 0 at the step S20 and sets the high load determination flag FWOT to 0 at the step S42, to thereby inhibit immediate execution of the fuel supply increase control.

FIGS. 18A to 18D collectively form a timing chart showing the timing relationship between the estimated catalyst temperature TCT and the values of the catalyst temperature determination flag FCATWOT, the intake pressure determination flag FPBWOT, and the high load determination flag FWOT. When the estimated catalyst temperature TCT exceeds the predetermined value TCTH, the ECU 5 sets the catalyst temperature determination flag FCATWOT to 1 at the step S19 in FIG. 2, sets the high load determination flag FWOT to 1 at the step S73 in FIG. 11, and at the same time multiplies the basic fuel amount Ti of the equation (1) by the high load-dependent fuel increasing coefficient KWOT to obtain a prolonged fuel injection period Tout, to thereby carry out the fuel supply increase control.

Figure 19:
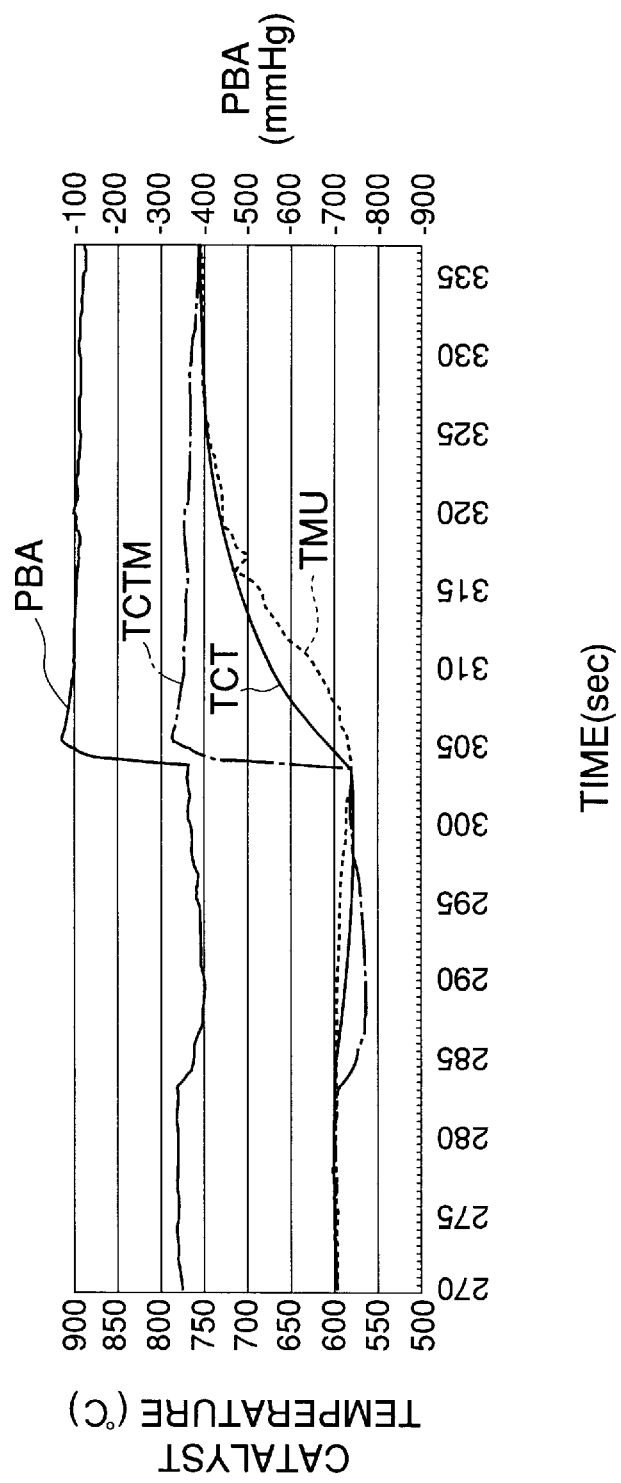
FIG. 19 is a graph showing the timing relationship between the estimated catalyst temperature TCT, the catalyst temperature map value TCTM, a measured catalyst temperature value TMU, and intake pipe absolute pressure PBA.

FIG. 19 shows the timing relationship between changes in the estimated catalyst temperature TCT, the catalyst temperature map value TCTM, an actual or measured temperature value TMU, and the intake pipe absolute pressure PBA. When the accelerator pedal is stepped on, the measured catalyst temperature value TMU progressively rises as the intake pipe absolute pressure PBA rises. The catalyst temperature map value TCTM is set to a higher value than the measured catalyst temperature value TMU by the predetermined amount, and the estimated catalyst temperature TCT calculated from the catalyst temperature map value TCTM, using the correction coefficients and the correction variables varies so as to assume a value close to the measured catalyst temperature value TMU.

Therefore, the temperature of the catalyst 15 can be correctly estimated, to enable carrying out the fuel supply increase control at timing suitable for the temperature of the catalyst 15 and hence prevent the catalyst 15 from being deteriorated or damaged by heat while improving exhaust emission characteristics and fuel economy of the engine 1.

In the present embodiment, it is determined that the catalyst 15 is in a high-temperature state in which the catalyst 15 can be deteriorated or damaged by heat when the estimated catalyst temperature TCT is equal to or higher than 900° C. Since the catalyst temperature map value TCTM retrieved at the step S7 in FIG. 2 is set to a higher value than the actual temperature of the catalyst 15 by the predetermined amount (e.g. 50° C.), even if the estimated catalyst temperature TCT exceeds the upper value 900° C. of the predetermined temperature TCTH, there is an allowance of the predetermined amount (e.g. 50° C.) before the actual temperature of the catalyst 15 exceeds 900° C. Thus, the safety of the catalyst 15 is guaranteed.

Alternatively, the catalyst temperature map value TCTM may be set to a value equal to the actual temperature of the catalyst 15. In this case, the upper value and lower value of the predetermined value TCTH should be set to 850° C. and 820° C., respectively, to thereby ensure the allowance of the predetermined amount (e.g. 50° C.). Further alternatively, the catalyst temperature map value TCTM may be set to a slightly higher value than the actual temperature of the catalyst 15 and at the same time the upper value of the predetermined value TCTH may be set to a slightly lower value than 900° C., to thereby ensure the allowance of 50° C.

The predetermined amount should be set to such a value that while the catalyst was not determined to be in a high-temperature state in the last loop of execution of the fuel supply control, the catalyst temperature cannot suddenly exceed a value at which the catalyst cannot be deteriorated or damaged by heat in the present loop, i.e. the predetermined amount should be set to a temperature amount greater than the maximum temperature amount by which the catalyst temperature can rise in a single loop of execution of the fuel supply control. In the present embodiment, the predetermined amount is set, e.g. to 50° C.

What is claimed is:

1. A fuel supply control system for an internal combustion engine having an exhaust system, and an exhaust gas-purifying device arranged in said exhaust system, comprising:

high load condition-detecting means for detecting a predetermined high load condition of said engine;

fuel-increasing means for increasing an amount of fuel supplied to said engine when said engine is in said predetermined high load condition;

temperature value memory means that stores temperature values indicative of temperature of said exhaust gas-purifying device according to operating conditions of said engine;

readout means for reading out a temperature value from said temperature value memory means according to operating conditions of said engine;

correction coefficient-determining means for determining a correction coefficient for correcting said temperature value read out from said temperature value memory means;

temperature-estimating means for estimating temperature of said exhaust gas-purifying device, based on said read-out temperature value and said correction coefficient; and control means for enabling said fuel-increasing means to increase said amount of fuel when said predetermined high load condition is detected and at the same time the estimated temperature is higher than a predetermined temperature value.

2. A fuel supply control system as claimed in claim 1, wherein said correction coefficient-determining means determines said correction coefficient according to operating conditions of said engine.

3. A fuel supply control system as claimed in claim 1, wherein said correction coefficient-determining means sets said correction coefficient to different values between when said engine is under fuel cut and when said engine is in said predetermined high load condition.

4. A fuel supply control system as claimed in claim 2 or 3, wherein said correction coefficient-determining means determines correction coefficient according to rotational speed of said engine and load on said engine.

5. A fuel supply control system as claimed in claim 4, wherein said correction coefficient-determining means sets said correction coefficient to a larger value as said rotational speed of said engine is larger and said load on said engine is higher.

6. A fuel supply control system as claimed in any of claims 1 to 3, further including correction means for correcting said read-out value of temperature according to at least one parameter of engine coolant temperature, intake air temperature of said engine, atmospheric pressure, and ignition timing of said engine.

7. A fuel supply control system as claimed in any of claims 1 to 3, wherein each of said temperature values stored in said temperature value memory means is set to a higher value by a predetermined amount than an actual value of temperature of said exhaust gas-purifying device to be assumed in the same operating condition of said engine as an operating condition of said engine to which said each of said temperature values corresponds.

8. A fuel supply control system as claimed in any of claims 1 to 3, wherein said predetermined temperature value is set to a lower value by a predetermined amount than a temperature value corresponding to a predetermined high-temperature state of said exhaust gas-purifying device.

9. A fuel supply control system as claimed in claim 8, wherein said predetermined amount is set to such a value that while said exhaust gas-purifying device was not determined to be in said predetermined high-temperature state in a last loop of execution of fuel supply control, temperature of said exhaust gas-purifying device does not suddenly exceed a value corresponding to said high-temperature state in a present loop of execution of said fuel supply control.

\* \* \* \* \*